3,145,166
DISPOSAL OF TOXIC CHEMICAL WASTES HAVING A HIGH CONCENTRATION OF CYANIDE ION
Robert H. L. Howe, West Lafayette, Ind., assignor to Eli Lilly and Company, Indianapolis, Ind., a corporation of Indiana
No Drawing. Filed Oct. 2, 1961, Ser. No. 141,978
1 Claim. (Cl. 210—16)

This invention relates to a novel process for the disposal of toxic chemical waste of both organic and inorganic origin, and in particular, it relates to an improved method of disposing of cyanide waste.

Toxic wastes from chemical plants present an extremely difficult disposal problem because of the fact that many such substances, even in minute concentrations, are dangerous to plant and animal life. In particular, cyanide, a constituent of many toxic chemical wastes, will kill fish at a concentration of 2 p.p.m. or less. Thus it is not possible to dispose of a cyanide waste by discharging it into a body of water unless the body of water has an extremely high dilution capacity, as for example is the case with an ocean or a large lake. Chemical plants which are land-locked frequently find it necessary to dispose of cyanide wastes by hydrolyzing the cyanide to ammonia and carbonic acid using concentrated sodium hydroxide. Alternatively, the cyanide can be oxidized with chlorine and lime (or other alkali) to produce ammonium ions and carbonate ions. This hydrolysis reaction requires standard reactor equipment and frequently the disposal step can be as expensive as the synthetic step from which the cyanide waste was derived. Either cyanide hydrolysis process has a high corrosion potential. Another method of disposing of waste hydrogen cyanide has been to burn it in gaseous form. However, extremely high temperatures are required and an even larger initial monetary investment in disposal equipment must be made than with a hydrolysis process.

Other toxic chemical wastes, as for example wastes containing boron trifluoride, also pose a difficult disposal problem. As with cyanide, however, it has been customary to destroy boron trifluoride by a hydrolysis reaction and then to dispose of the hydrolysis products in a conventional manner as by neutralization and precipitation. The disposal of other toxic chemicals has customarily required similar processing steps.

It is an object of this invention to provide a rapid, efficient and inexpensive method of disposing of toxic chemical waste. It is a further object of this invention to provide a method of disposing of cyanide waste which does not involve either chemical treatment or burning. Other objects of this invention will become apparent from the description which follows.

The novel method of disposing of toxic chemical waste provided by this invention comprises either a disposal process involving the aerobic decomposition, or the anaerobic digestion, of such waste, or a disposal process involving in sequence, both aerobic and anaerobic processes in any order. Only conventional waste disposal equipment is required by this novel process. The organisms present in the anaerobic digestion apparatus include those commonly found in septic tanks and the like apparatuses including organisms such as *Desulfovibrio desulfuricans*, *Streptococcus faecalis*, various Clostridia as well as other putrefactive anaerobes, both obligate and facultative. The organisms which accomplish the aerobic decomposition of toxic waste in the aerobic decomposition unit include various Aerobacter species, *Esherichia coli* and other coliform bacteria, various Pseudomonas, yeasts, *Aspergillus niger*, algae, etc.

In carrying out the process provided by this invention, in particular where hydrogen cyanide is the chief toxic constituent of the waste and therefore toxic concentrations of hydrogen cyanide are to be reduced to a safe level, I prefer to employ an anaerobic digestion step followed by an aerobic decomposition process in order to lower the level of the toxic chemicals in the effluent from the disposal equipment to safe and hygienic levels. An anaerobic digested sludge can be used as an adjunct in the aerobic decomposition as an aid in reducing the toxicity of the waste. The anaerobic digested sludge is a blackish, amorphous non-plastic material which is an end product of anaerobic digestion of sewage or other organic waste solids.

Customarily my invention is carried out as follows: a toxic chemical waste is collected. This toxic waste usually contains, as chief toxic constituent, either hydrogen cyanide or methyl cyanide, and may contain in addition one or more of the following classes of toxic chemicals: solvents such as benzene, phenol, and aliphatic alcohols; organic mercury compounds including thimerosal; heavy metals; fluoride ions; as well as various organic intermediates including aldehydes, ketones, and esters, such as might be produced in the routine operation of a diversified chemical manufacturing plant. After collection, the toxic waste is pumped into a holding tank and from there into an ordinary anaerobic fermentation tank or digester. Ordinarily, I operate my novel waste disposal process by using two anaerobic digesters in series, the second one being filled by overflow from the first. The effluent from the second anaerobic digester is passed into an aeration tank where it is kept until analyses for the various toxic constituents originally present demonstrate that each toxic consituent is at a permissible level for dumping into a small body of water.

More specifically, my preferred method of disposing of toxic chemical waste is carried out as follows: the toxic waste is passed into an anaerobic digester which is kept at a temperature in the range 85–110° F. The second digester, which is filled by overflow from the first, is kept at the temperature of the surroundings, or ambient temperature. The partially detoxified waste from this second digester is passed into a standard aeration tank to which an anaerobic fermentation sludge is advantageously added. The effluent from this aeration tank, after it has passed the requisite test for safety with regard to the level of each toxic constituent, is released for final disposal in a running stream or small lake. The aerobic process step as carried out above involves not only bio-oxidation of the toxic materials, but also absorption of the toxic materials by the anaerobic fermentation sludges specifically added for this purpose.

The chief toxic consistuent of toxic chemical wastes which can be readily removed by my novel process is cyanide. I have found that a concentration of cyanide ion as high as 4300 p.p.m. can be tolerated and destroyed by the anaerobic organisms present in the digesters or by the aerobic organisms in the aeration tank. It is wholly surprising that an ordinary aerobic process unit or anerobic fermentation unit or digester would be able to handle toxic wastes containing such high concentrations of cyanide ion since it is well known in the biochemical art that cyanide is a specific poison for a variety of enzymes, many of which are present in the species of bacteria commonly encountered in both the aerobic unit and anaerobic fermenter. In particular, the cytochrome enzymes which are responsible for oxygen metabolism in many bacteria, as well as in higher organisms, are specifically poisoned by cyanide. The presence of such an extremely high concentration of cyanide ion, in my process for cyanide detoxification, however, seems to have little or no effect upon the enzyme systems responsible for hydrogen transfer in the anaerobic bacteria present and do not interfere with the metabolism of many of the organisms utilized in the aerobic disposal step. Despite the supposition that cyanide ion should interfere with the life processes of both anaerobic and aerobic organisms, my novel process of waste disposal as outlined above yields an effluent in which there is little or no detectable cyanide ion present; and the anaerobic and aerobic processes continue unhampered by the high cyanide concentration.

Many catalysts can be employed to facilitate and speed up the destruction of cyanide in the toxic wastes. Among such catalysts are molybdate, phosphate, and chloride ions. These can be present in concentrations varying from 2 to 5 mg. per liter. The presence of catalysts is not mandatory but may be useful under certain operating conditions. The catalysts are particularly advantageous when utilized in the anaerobic fermentation step.

Other toxic chemicals which can be disposed of by my novel process include many other compounds which are enzyme poisons, as for example, fluoride ion, phenol, aliphatic alcohols, thimerosal, and various other heavy metal compounds. These toxic compounds also might be expected to interrupt the metabolism of the average anerobic or aerobic organism present in the digesters or fermenters in such a way that the organism would either be killed outright or would no longer metabolize nutrients in its usual manner. However, no such interference is encountered in actual practice.

The novel process of this invention as outlined above has the advantage of requiring no chemical treatment and, thus, no expensive chemical reactor equipment for the disposal of toxic chemical wastes. The chief end products of the toxic chemical wastes formed by bacterial action are nontoxic compounds which are relatively easy to dispose of; for example, cyanide ion is converted to cyanate, or thiocyanate which is in turn converted to nitrogen or ammonia and carbon dioxide or sulfur dioxide.

The following examples more fully illustrate the nature of my novel process.

EXAMPLE 1

*Anaerobic Treatment of Toxic Waste*

Two 55-gallon digestion tanks were connected in series such that the overflow from the No. 1 digestion tank passed into the bottom of the No. 2 digestion tank and the overflow from the No. 2 tank passed into a holding tank from which samples could be procured. The first tank was heated and maintained at 110–115° F. with an electric heating element. 100 gal. of sludge from an anaerobic fermentation unit were added to the system, thus filling each of the digesters to a point somewhat above the overflow pipe. The acidity of the fermentation liquid, quantity and quality of gas produced, and the temperature were checked periodically. Initially, 1 gram of sodium cyanide, ammonium molybdate $$[(NH_4)_6Mo_7O_{24}]$$

disodium phosphate, and ferric chloride were added to the No. 1 digester. Subsequently, 0.833 gal. of common sewage digester-mixed liquor and 12 grams of sodium cyanide dissolved in 100 ml. of water were added at intervals of 4 hours to the No. 1 digester. The addition of the cyanide was continued for 10 days. The temperature range in the No. 1 digester was 85–110° F. The gas pressure varied between 1.2 and 2.3 inches of water and all gas samples were combustible. The initial cyanide concentration was 100 p.p.m. and if no destruction of the cyanide had occurred, the final concentration would have been 1,000 p.p.m. However, the actual final concentration was about 100 p.p.m.

EXAMPLE 2

*Aerobic Treatment of Toxic Waste*

During a 3-day period, 1740 gal. of a toxic chemical waste containing cyanide, sulfite, and fluoride ions were treated as follows: The waste was placed in an aerobic holding tank and was then diluted with an anaerobic digestion sludge. The diluted waste was kept for about 24 hours in the aerobic holding tank with continuous mixing provided. The waste entering the aeration tank had a concentration of cyanide ion varying from about 670 to 770 p.p.m. as a daily average. After the aeration period, the waste was allowed to settle. At this point the effluent contained less than 7.7 p.p.m. of cyanide ion. The effluent was subjected to a further biological oxidation treatment in an aeration tank which reduced the cyanide ion concentration to less than 0.1 p.p.m. It was determined that the effluent was entirely nontoxic to fish as indicated by 100 percent survival rate of fish placed in the effluent.

EXAMPLE 3

*Anaerobic Sludge Treatment of Toxic Waste*

Two 225,000 gal. anaerobic digesters were placed in series as in Example 1 and a pre-determined quantity of the sludge from the second anaerobic digester was pumped into a mixing tank. Cyanide waste was mixed with the anaerobic sludge at this point. From the mixing tank the mixture was passed into a 55,000 gal. aeration tank and subjected to a bio-oxidation and absorption process. The following Table I summarizes the operation of this system over a four-month period. Column 1 gives the pounds of cyanide ion received during the month, column 2 the pounds of cyanide remaining after the biological treatment with digestion sludge and column 3 the amount of cyanide present after the complete biological treatment. As can be seen from Table I, a total of 24,673.07 pounds of cyanide ion were disposed of during this four-month period. The maximum cyanide received by the treatment unit during a given day in this period was 750 pounds.

TABLE I

| | Pounds of cyanide ion received during the month | Pounds of cyanide remaining after biological treatment with anaerobic sludge | Pounds of cyanide present after further aerobic treatment |
|---|---|---|---|
| 1st month | 4,730.0 | 238.4 | None detectable. |
| 2d month | 7,515.6 | 622.45 | Do. |
| 3d month | 7,890.0 | 961.70 | Do. |
| 4th month | 7,170.0 | 809.98 | Do. |
| Total | 27,305.6 | 2,632.53 | |

Table II which follows gives a typical operation report of the above process for a single month.

TABLE II

| Date | Flow, Gal. | CN Rec'd, lbs. | CN T21 Eff., lbs.[1] | CN T21 Eff., p.p.m. | CN Final Eff., p.p.m. | CN Contact Eff., p.p.m.[2] |
|---|---|---|---|---|---|---|
| 1 | 20,030 | 360 | 47.0 | 284 | 0 | 1– |
| 2 | 15,650 | 240 | 9.3 | 73.3 | 0 | 1– |
| 3 | 31,330 | 120 | 5.3 | 20.2 | 0 | 1– |
| 4 | | | | | 0 | |
| 5 | | | | | 0 | |
| 6 | 17,430 | 50 | 1.94 | [1]13.3 | 0 | 1– |
| 7 | 12,000 | | 0.76 | 7.6 | 0 | 1– |
| 8 | 13,000 | 72 | 2.13 | 20.2 | 0 | 1– |
| 9 | 11,480 | 172 | 3.75 | 45.0 | 0 | 1– |
| 10 | 30,400 | 384 | 48.0 | 194.0 | 0 | 1– |
| 11 | | | | | 0 | |
| 12 | | | | | 0 | |
| 13 | 19,430 | 432 | 21.9 | [1]134.6 | 0 | 1– |
| 14 | 24,640 | 360 | 27.4 | [1]134.6 | 0 | 1– |
| 15 | 20,080 | 360 | 21.7 | [1]130.0 | 0 | 1– |
| 16 | 15,420 | 360 | 25.6 | 198.2 | 0 | 1– |
| 17 | 25,340 | 360 | 44.0 | 210.6 | 0 | 1– |
| 18 | | | | | 0 | |
| 19 | | | | | 0 | |
| 20 | 20,820 | 360 | 29.4 | 171.6 | 0 | 1– |
| 21 | 18,430 | 420 | 29.6 | 195.0 | 0 | 1– |
| 22 | 16,710 | 450 | 30.0 | 218.4 | 0 | 1– |
| 23 | 22,330 | 750 | 68.0 | 365.5 | 0 | 1– |
| 24 | 18,500 | 450 | 24.0 | 204.0 | 0 | 1– |
| 25 | 14,760 | 360 | 19.0 | 156.0 | 0 | 1– |
| 26 | 14,390 | 240 | 42.5 | 352.0 | 0 | 1– |
| 27 | 20,020 | 360 | 49.5 | 296.4 | 0 | 1– |
| 28 | 53,660 | 240 | 126.0 | 280.8 | 0 | 2.4 |
| 29 | 40,480 | 120 | 68.0 | 202.8 | 0 | 1– |
| 30 | 30,060 | 150 | 58.5 | 234.0 | 0 | 1– |
| 31 | 17,330 | 120 | 6.7 | 46.8 | 0 | 1– |

[1] T21 Process is a biological oxidation and absorption system using digested sludge.
[2] "Contact" process is an aerobic biological oxidation process using conventional sewage treatment equipment.

I claim:

The method of disposing of a toxic chemical waste having a cyanide ion concentration of at least 670 p.p.m. which comprises subjecting said waste to an anaerobic digestion process, thereby reducing said cyanide ion content to below about 365 p.p.m., and then subjecting the effluent from said anaerobic digestion process to an aerobic decomposition process whereby the cyanide ion content of the effluent from said aerobic decomposition process is decreased to less than 0.1 p.p.m. of cyanide ion.

References Cited in the file of this patent

UNITED STATES PATENTS 2,875,151    Davidson _____ Feb. 24, 1959

OTHER REFERENCES

Industrial Wastes, Rudolfs, 1953, Reinhold Pub. Co., N.Y., pages 307–308 relied on.

Cyanide Destruction on Trickling Filters, Gurnham, Proc. 10th Ind. Waste Conf., Purdue University, 186–193 (1955).

"Effect of Polysulfide Treated Cyanide Case Hardening . . . Wastes on Sludge Digestion," Ridenour et al., Sewage Works Journal, vol. 17, pp. 966–978 (1945).

"The Aerobic Metabolism of Potassium Cyanide," Nesbitt et al., Proc. 14th Indust. Waste Conf., Purdue Univ. (1959), pages 518–534.